United States Patent

Powell

[15] 3,693,459
[45] Sept. 26, 1972

[54] SPEEDOMETER AND ODOMETER ASSEMBLY

[72] Inventor: Patrick L. Powell, Franklin Park, Ill.

[73] Assignee: Stewart Warner Corporation, Chicago, Ill.

[22] Filed: Feb. 10, 1971

[21] Appl. No.: 114,193

[52] U.S. Cl. ................................. 73/490, 73/519
[51] Int. Cl. ................................................ G01p 3/42
[58] Field of Search ............... 73/490, 519; 235/95 R

[56] References Cited

UNITED STATES PATENTS

| 2,073,153 | 3/1937 | Helgeby | 73/519 |
| 3,196,692 | 7/1965 | Jensen | 73/519 X |
| 1,597,691 | 8/1926 | Olsen | 73/490 X |

FOREIGN PATENTS OR APPLICATIONS

| 89,267 | 8/1922 | Austria | 73/519 |
| 417,093 | 8/1925 | Germany | 73/519 |
| 563,270 | 5/1957 | Italy | 73/519 |

Primary Examiner—James J. Gill
Attorney—Augustus G. Douvas and William J. Newman

[57] ABSTRACT

The following specification describes a speedometer having a worm gear on the field cup of the magnet driving the speed cup for simultaneously driving an odometer. In addition, the speedometer is provided with a one piece stamped U-shaped bracket for supporting the odometer and cross shaft transmitting movement from the field cup to the odometer with a tubular element fixed to the bracket for rotatably supporting the magnet shaft and cooperating with the bracket to prevent axial separation of the magnet shaft. The odometer dial brackets are positioned to form stops for the speed cup.

7 Claims, 7 Drawing Figures

PATENTED SEP 26 1972 3,693,459
SHEET 1 OF 2
FIG. 1
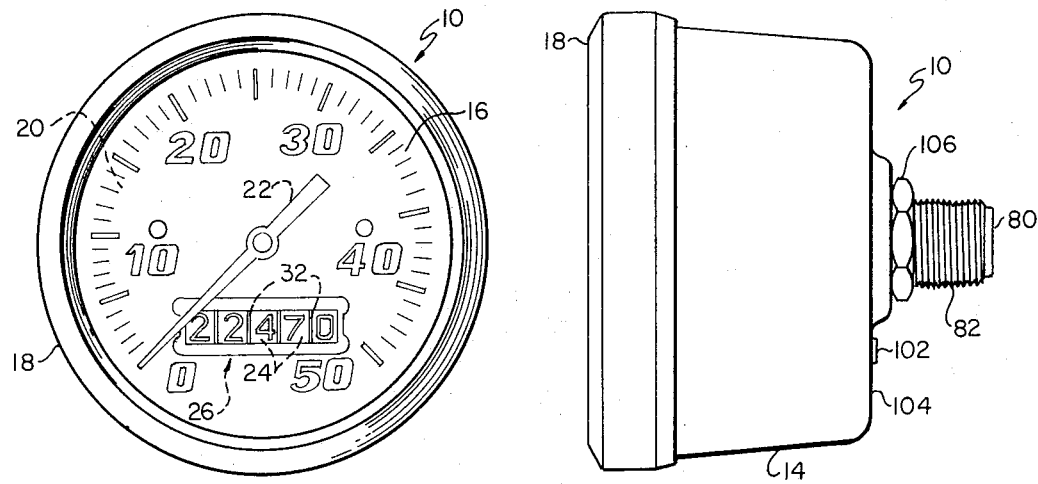
FIG. 2
FIG. 3
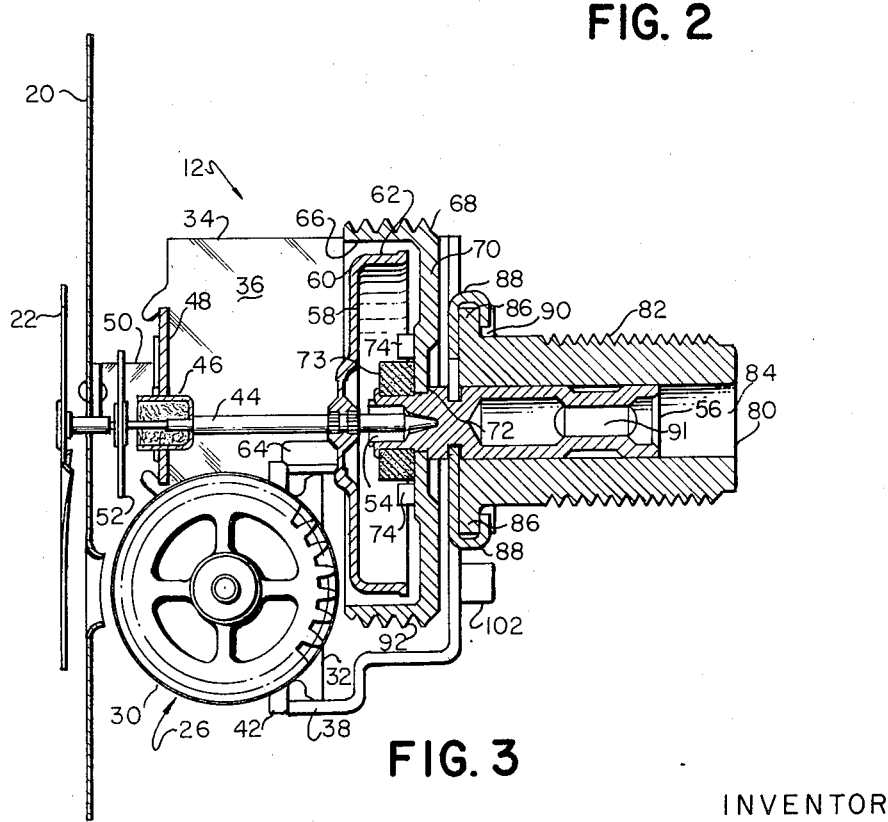
INVENTOR
Patrick L. Powell
By _____
Attorney

PATENTED SEP 26 1972  3,693,459

INVENTOR
Patrick L. Powell

By Morton Lesser
Attorney

SPEEDOMETER AND ODOMETER ASSEMBLY

BACKGROUND OF THE INVENTION

1. Field of the Invention

This invention relates in general to a combined speedometer and odometer and more particularly to an improved and more economical combined bicycle speedometer and odometer assembly.

2. Description of the Prior Art

The usual arrangement in a combined speedometer and odometer assembly is to provide a gear on the magnet shaft for transmitting power from the magnet shaft through a pair of serially arranged cross shafts, each having a pair of gears, to a gear driving the odometer. In addition, the main or frame bracket for supporting the shafts is usually a U-shaped cast piece having an integral cast boss projecting rearwardly from the rear leg of the bracket to which the ferrule of the flexible shaft casing is secured. A bronze collar is required to be press fit in the boss for rotatably securing the magnet shaft driven by the flexible shaft in the casing and additional tabs are required to provide bearing supports for the cross shafts and stops for the speed cup.

SUMMARY OF THE INVENTION

By forming gear teeth on the magnet shaft field cup, the gear teeth are generally aligned tangentially adjacent the radial plane of the odometer drive gear, thereby enabling a single cross shaft to transmit power from the magnet shaft to the odometer.

The frame bracket is formed of a U-shaped economical lightweight stamping with an enlarged opening in the rear leg to enable the magnet shaft having the field cup and magnet at one end to be inserted therethrough. One edge portion of the opening thereafter is engaged with a groove in the magnet shaft to prevent axial shaft displacement and the head of a tubular element having a larger diameter than the opening is then fitted over the rearwardly projecting portion of the magnet shaft and secured to the bracket rear leg to prevent radial movement of the magnet shaft for disengaging from the hole edge portion and for rotatably supporting the magnet shaft. The tubular element also enables the casing ferrule to be secured to the rear leg of the frame bracket. Additionally, tabs or tangs on the frame bracket rotatably support the cross shaft and locate the speedometer in the housing while the side bracket legs support the odometer with the odometer brackets providing stops for the limiting rotation of the speed cup and pointer shaft.

The above and other objects of the invention will become apparent on examination of the following specification and claims together with the drawings.

BRIEF DESCRIPTION OF THE DRAWINGS

FIG. 1 is a front elevational view of a bicycle speedometer and odometer housing assembly incorporating the principles of the present invention;

FIG. 2 is a side elevational view of the speedometer and odometer housing assembly shown in FIG. 1;

FIG. 3 is a sectional view of the speedometer portion of the assembly with the odometer shown in side elevation together with a portion of the housing assembly shown in phantom lines;

DESCRIPTION OF THE PREFERRED EMBODIMENT

Figure 4:
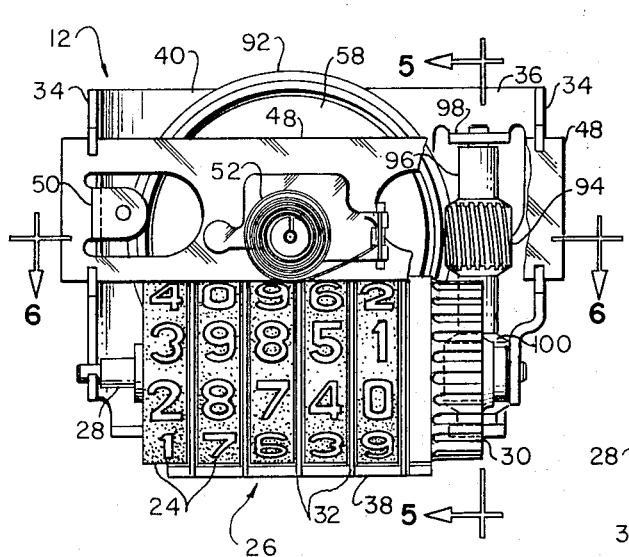
FIG. 4 is a front elevational view of the speedometer and odometer assembly with the housing assembly omitted.
Figure 5:
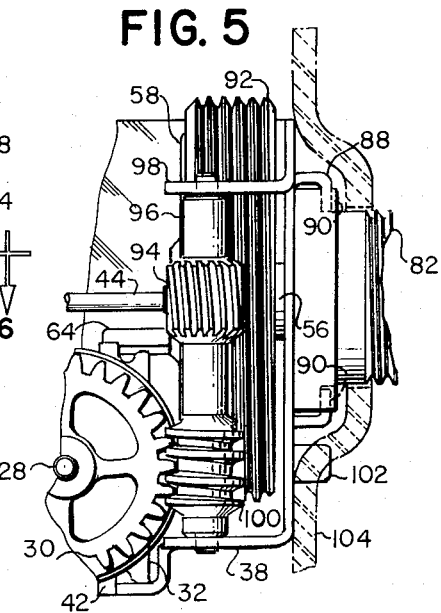
FIG. 5 is a sectional view taken generally along the line 5—5 in FIG. 4.

In FIGS. 1 and 2 a housing assembly indicated by the reference character 10 supports a speedometer and odometer assembly 12 best seen in FIGS. 3 and 4. The housing assembly 10 comprises a cup-shaped housing 14 having a transparent plate 16 secured at the open end of housing 14 by a bezel 18.

A dial plate 20 seen through the plate 16 is marked with indicia for indicating speed by means of a pointer 22 whose position corresponds to speed. In addition, a plurality of axially arranged dials 24 of an odometer 26 having indicia marked thereon to indicate distance traveled, are seen through the plate 16 and an opening in the dial plate 20.

The odometer 26 may be of the type shown in U.S. Pat. No. 3,432,096 or a conventional odometer that includes in addition to the dials 24, a shaft 28 rotatably supporting the dials 26 and a gear 30 adjacent one end of the shaft, together with bracket 32 between each pair of dials. Each bracket 32 rotatably supports a pinion (not shown) between each pair of dials to incrementally advance each higher order dial for each complete revolution of the adjacent lower order dial and the gear 30. The ends of the shaft 28 are supported in appropriate openings formed in side legs 34 of a U-shaped stamped frame bracket 36. A tang or tab 38 depending from the rear leg 40 of the frame bracket engages the lower ear 42 of each pair of ears on each bracket 32, as seen in FIG. 3, to prevent rotation of the respective bracket.

The pointer 22 is fixed to one end of a pointer shaft 44 passing through a bearing 46 located in a plate 48. Plate 48 extends between ends of the side legs 34 of the frame bracket 36. The plate 48 has a pair of forwardly extending tabs 50 to which the dial plate 20 is secured and the pointer shaft extends through a regulator assembly 52 for biasing the shaft and through the dial plate 20 for receiving the pointer 22.

Figure 6:
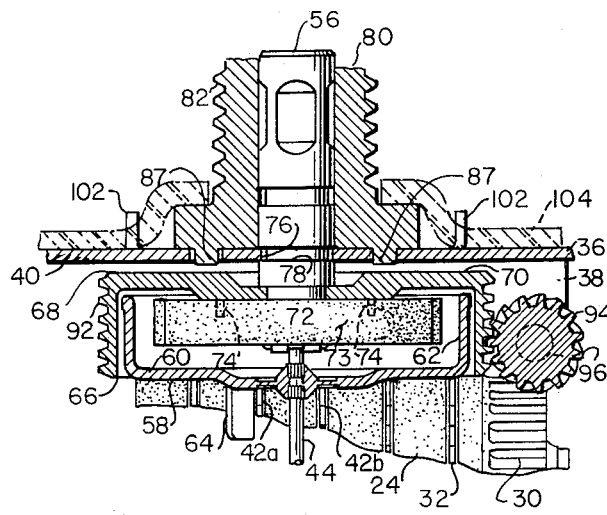
FIG. 6 is a sectional view taken generally along the line 6—6 in FIG. 4.
Figure 7:
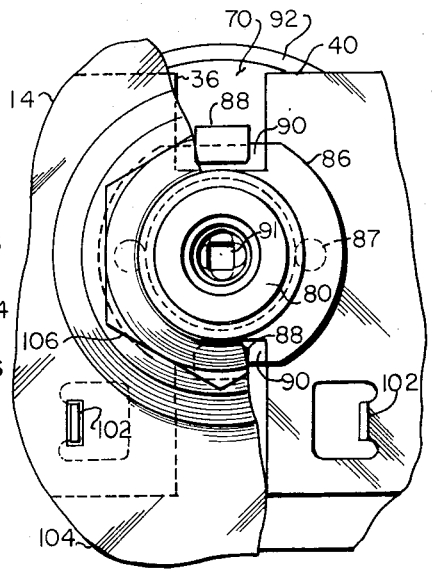
FIG. 7 is a fragmentary rear elevational view of the rear bracket leg and tubular element.

The shaft 44 is rotatably supported at its other end in a recess 54 of a coaxial magnet shaft 56 whose axis it will be noted from the drawings is perpendicular to the axis of the odometer dials and gear. The pointer shaft 44 has fixed thereto adjacent said other end an eddy or speed cup 58. The speed cup 58 is cup-shaped having a back wall 60 and a rim wall 62. An adjustably bent tab 64 is formed on wall 60 for coacting with respective odometer bracket ears 42a and 42b, seen best in FIG. 6, to stop the pointer shaft and pointer at respective limit zero and maximum speed positions.

The rim wall 62 is nestingly received within a rim wall 66 of a cup-shaped flux collector or field cup 68 to provide a path for the magnetic flux from a bar magnet 73 through the speed cup 58. The back wall 70 of the field cup 68 is supported on the magnet shaft 56 and sandwiched between a shoulder 72 on the shaft 56 and the bar magnet 73, which is axially held by staking the adjacent magnet shaft end. A plurality of spaced tabs or tangs 74 formed on the back wall 70 of the field cup engage the elongate or radially extending sides of the bar magnet to prevent relative rotation between the field cup 68 and magnet shaft 56 when the field cup is placed under load by rotation of the magnet shaft for driving the odometer dials.

The magnet shaft 56 passes through a large diameter passageway or opening 76 in rear leg 40 of the frame bracket 36 and has a groove 78 for engaging an edge of a smaller diameter portion of opening 76. Thus, the magnet shaft 56 on assembly to bracket 36 is passed rearwardly with the magnet and field cup attached through the opening 76. When groove 78 is aligned with rear leg 40, the shaft is moved radially to engage groove 78 with a partially circular edge portion of opening 78 having a diameter closely approaching the minimum groove diameter but extending less than 180° to enable a large engagement area therebetween with the edge portion holding the magnet shaft against axial movement. A tubular element 80 having external threads 82 and a bore 84 for rotatably supporting the magnet shaft 56 is engaged with the rearwardly projecting portion of shaft 56. A head 86 larger than the diameter of opening 76 and bridging opposite edge portions of opening 76 is integrally formed on the one end of tubular element 80 and secured in abutment with rear leg 40 to prevent radial movement of shaft 56 and disengagement thereof from the edge portion of opening 76. A pair of spaced lugs 87 on the head 86 engage in respective openings in the rear leg 40 to circumferentially locate the head 86.

The head 86 including the tubular element 80 are secured to leg 44 by a pair of diametrically opposed tabs 88 on leg 44 bent over flat sides of head 86 and located in flat sided grooves 90 in the head to lock the head against rotation. Since the radial position of the magnet shaft 56 relative opening 76 is held by the tubular element 80, the shaft 56 is securely fixed against any axial movement by the edge portion of opening 76 engaging groove 78. The magnet shaft 56, magnet 73 and field cup 68 are rotated by the flexible shaft noncircular end inserted in the conventional noncircular magnet shaft opening 91. The rotation of the magnet and field cup drives the speed cup 58, pointer shaft 44 and pointer 22 to a position corresponding to the vehicle or bicycle speed. The casing of the flexible shaft is secured to the tubular element 80 by means of the conventional nut engaged with the threads 82.

It will be noted the peripheral surface of the field cup rim wall 66 is provided with a worm gear 92. The worm gear 92 thus conveniently rotates through a tangential position generally adjacent a plane common to the odometer drive gear 34 for engagement with the teeth of a helical gear 94 formed on a shaft 96 whose axis is in or adjacent the radial plane. The shaft 96 is rotatably supported by a tab 98 integrally formed on the rear leg 40 and a slot in the integrally formed tab 38 of the frame plate. A worm wheel 100 formed on shaft 96 spaced from gear 94 and lying in the radial plane of gear 30 engages the odometer drive gear 30 to drive the odometer dials 24 through a distance corresponding to each revolution of the magnet shaft 56 and field cup 68.

A pair of additional tabs or tangs 102 are formed on rear leg 40 of bracket 36 and these tabs together with element 80 inserted through appropriately spaced openings in the rear wall 104 of the housing 14 to prevent rotation of the speedometer and odometer assembly 12 relative the housing 14. A nut 106 threaded on the threads 82 tubular element 80 secures the speedometer and odometer assembly 12 against axial movement relative housing 14, whereafter, housing is assembled to the vehicle or bicycle on which it is used and the flexible shaft casing ferrule nut threaded on element 80.

As previously explained the end of a flexible shaft (not shown) is inserted in the opening 91 with the flexible shaft being rotated by a bicycle wheel, for example. The shaft casing is secured to the tubular element 80 by means of threads 82 and on rotation of the flexible shaft, the magnet shaft 56 is rotated. The magnet shaft 56 on rotating transfers power through the eddy cup means including the magnet 73, the field cup 68 and the speed cup 60 to drive the speed cup 60 and pointer 22 to a circumferential position corresponding to the speed and against the bias of the regulator assembly spring. In moving from the zero or normal position, the speed cup tang is disengaged from the bracket ear 42a whereafter it will limit rotation of the pointer shaft to a second predetermined position on engagement with the adjacent bracket ear 42b so that at least 270° of travel is permitted.

In the meantime rotation of the field cup causes worm gear 92 to drive the helical gear 94 which is generally tangentially engaged with gear 92. Gear 94 in turn drives the worm gear 100 and gear 30 to advance the dials 24 for indicating the distance traveled.

The foregoing is a description of an improved speedometer and odometer assembly particularly adapted for use on a bicycle and whose inventive concepts are believed to have been set forth and typified by the accompanying claims.

What is claimed is:

1. For use with an odometer having a plurality of axially arranged dials adapted to be incrementally advanced by an axially aligned gear, the improvement comprising a U-shaped frame bracket, means for supporting said odometer dials and gear between the side legs of said frame bracket and spaced from the rear leg of said frame bracket with said gear located adjacent one of said side legs, a magnet shaft having one end passing rotatably through said rear leg, a field cup fixed to said shaft having a back wall frictionally secured to said magnet shaft and a rim wall extending axially toward said magnet shaft one end, a bar magnet fixed to said shaft between said one end and the back wall of said cup with said magnet having side walls extending radially of said magnet shaft, a pointer shaft having a speed cup with a rim wall nested between the ends of said bar magnet and field cup rim wall, means including said magnet shaft for rotatably supporting said pointer shaft and speed cup for rotatable movement in response to rotation of said magnet and field cup, a worm gear formed on the outer periphery of said field cup rim wall with said worm gear passing tangentially adjacent said one side leg, a last shaft having a pair of spaced coaxial gears for engaging said worm gear and odometer gear respectively for transmitting rotational movement from said magnet shaft to said odometer gear, means integrally formed on said field cup spaced radially outwardly of said magnet shaft for engaging said magnet side walls to orient the field cup relative the magnet and prevent relative rotation between said magnet and field cup.

2. The improvement claimed in claim 1, in which said integrally formed means on said field cup spaced radially outwardly of said magnet shaft for preventing relative rotation between said magnet and field cup comprises a plurality of tangs formed on said field cup back wall for engaging the side walls of said bar magnet.

3. The improvement claimed in claim 1 in which a bracket is provided between each pair of said dials, and a stop is integrally formed on said speed cup for engaging respective ones of said brackets to limit rotation of said speed cup and pointer shaft in respective directions.

4. In the improvement claimed in claim 1, a tubular element for rotatably supporting said magnet shaft and having a head at one end in abutment with said rear leg, and means integrally formed on said one leg for overlapping engagement with said head to secure said tubular element to said frame bracket.

5. In the improvement claimed in claim 4, a cup-shaped housing having a back wall with a plurality of openings therein with one of said openings receiving said tubular element, and a plurality of tangs integrally formed on said frame bracket rear leg each engaging in a respective housing opening to prevent relative rotation between said frame bracket and housing.

6. In the improvement claimed in claim 1, a pair of spaced tabs integrally formed on said frame bracket for rotatably supporting said last shaft.

7. An assembly comprising an odometer having a plurality of axially arranged dials adapted to be incrementally advanced by an axially aligned gear, a U-shaped frame bracket, means for supporting said odometer dials and gear between the side legs of said frame bracket and spaced from the rear leg of said bracket with said gear having a radial plane located adjacent one of said side legs, a magnet shaft, a field cup fixed to said shaft adjacent said one end and having a rim wall with the periphery of said rim wall passing tangentially adjacent said radial plane, a bar magnet having radially extending side walls and fixed to said shaft between said one end and the back wall of said cup, means on said magnet shaft frictionally securing said field cup and magnet to said magnet shaft against relative rotation, a pointer shaft having a speed cup fixed thereto, means including said magnet shaft for rotatably supporting said pointer shaft and speed cup for rotatable movement in response to rotation of said magnet and field cup, a passageway in said rear leg for receiving said magnet shaft, said magnet shaft having a groove intermediate said field cup back wall and the other end of said magnet shaft for receiving an edge portion of said rear leg passageway to limit axial movement of said magnet shaft, a tubular element having a bore for rotatably supporting said magnet shaft and a threaded periphery, a headed portion at one end of said tubular element bridging said rear leg passageway for engaging against one surface of said back leg, a pair of flat surfaces on said headed portion, a pair of spaced tangs formed on said back leg for overlapping engagement with said flat surfaces to secure said headed portion to said rear leg and against rotation whereby said magnet shaft groove is prevented from disengaging from said passageway edge portion, a worm gear formed on the periphery of said field cup rim wall and passing tangentially adjacent said radial plane, a shaft having a pair of spaced gears for engaging said worm gear and odometer gear respectively for transmitting rotational movement from said magnet shaft to said odometer gear, and means integrally formed on said field cup spaced radially outwardly of said magnet shaft for engaging said bar magnet side walls to orient the field cup relative the magnet and further prevent relative rotation between said magnet and field cup.

* * * * *